May 9, 1961     W. H. DEXTER     2,983,553
LINEAR BEARING
Filed Feb. 24, 1959
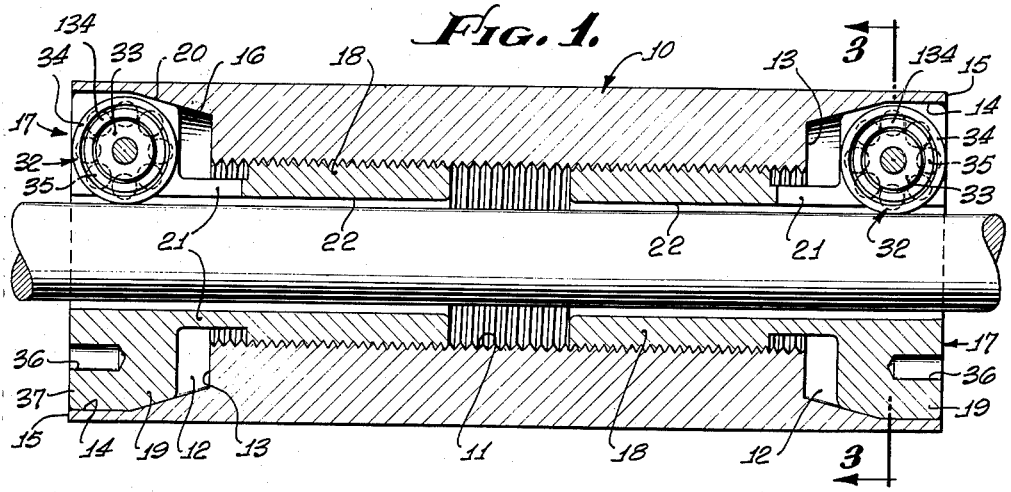
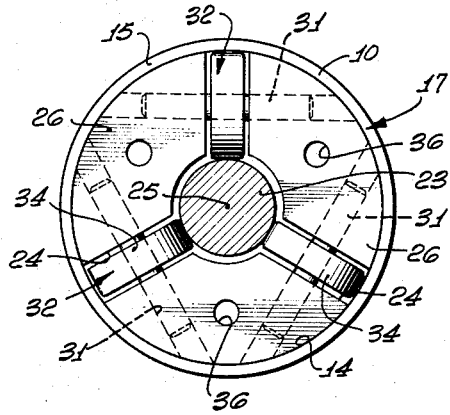
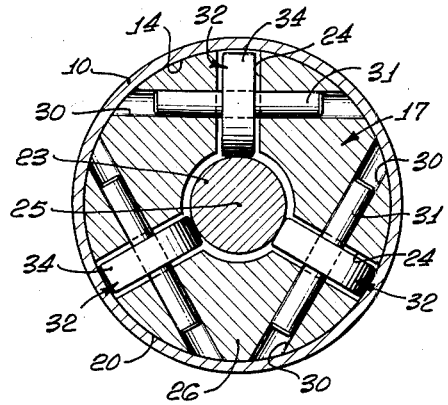
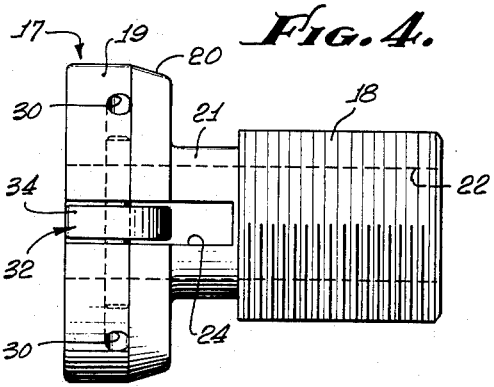
WILBUR H. DEXTER
INVENTOR.
BY *White & Haefliger*
ATTORNEYS.

1

United States Patent Office 2,983,553
Patented May 9, 1961

2,983,553
LINEAR BEARING
Wilbur H. Dexter, 421 W. Arbor Vitae, Inglewood, Calif.
Filed Feb. 24, 1959, Ser. No. 795,185
11 Claims. (Cl. 308—6)

This invention relates generally to the subject of linear bearings, and more particularly concerns the construction and design of a novel linear bearing which represents what is believed to be a substantial improvement over known types of linear bearings.

Speaking with reference to the state of the particular art with which the invention is concerned, known linear bearings are typified in their construction by an endless and linearly elongated arrangement of bearing balls contained by a similarly arranged loop shaped track. In operation, a shaft or rod is supported for endwise movement or reciprocation by and between a number of such endless loops of bearing balls, the latter rolling on a surface of the rod and also rolling in their endless loop shaped configuration to the extent necessary to accommodate shaft endwise movement. However, among the disadvantages of these looped configurations of bearing balls are the rather high degree of friction associated with movement of a large number of balls in rubbing engagement with one another, the degree of friction increasing in accordance with the load exerted on the balls. Also, the latter tend to resist movement around the most sharply curved sections of the track and to an undesirable degree adding to the resistance to rod endwise movement. Furthermore, exact centering of a rod for endwise movement is difficult if not impossible to attain using such endless looping configurations of bearing balls for the reason that the large number of balls necessary in the endless loop configuration is not conducive to exact positioning of the rod with which the balls are in engagement.

The present invention represents a clear departure from the thinking associated with the design and application of the previously known endless looping configuration of bearing balls, in that it is predicated upon the concept of exact centering or positioning of a rod or shaft on another member by rollers which are adjustably shiftable in such relation to the rod or shaft as to achieve the desired exact centering thereof. Accordingly, the invention contemplates broadly the provision of an assembly for supporting an axially elongated member such as a rod, the assembly including an axially extending body means relative to which the member is axially movable, carrier means adjustably shiftable relative to the body means and a plurality of rollers spaced about the axis and supported by the carrier means for rotation in axial radial planes, the rollers being bodily displaceable in said planes into close engagement to the surface of the axial rod member in response to adjustment shifting of the position of the carrier means relative to the body means. To accomplish such adjustment shifting, the body and carrier means preferably have coaxial threads, as well as interengaged cam surfaces through which force is transmissible acting to retain the carrier means and rollers in desired position relative to the body means. For example, the carrier means typically includes a pair of axially spaced carriers received into opposite ends of the tubular body means with the carrier means threaded coaxially into the latter. Accordingly, adjustment rotation of the carriers as by screwing them further into the body means causes camming of the carriers against the body means and results in inward bodily displacement of portions of the carrier means and rollers to an adjustable degree, typically bringing the rollers into exact centering engagement with the elongated member or rod, and reducing to a minimum frictional resistance to rolling or rotation of the rollers in response to relative axial endwise displacement of the rod.

Continuing with the description of the preferred construction of the linear bearing, the rollers are desirably supported by cantilevered portions of the carriers, such portions containing slits extending in axially radial planes and receiving the rollers. Furthermore, the carriers have webs connecting the carrier cantilevered portions with the carrier threaded portions, webs being adapted to flex in response to continuous screwing of the carriers into the tubular body after the carrier or body cam surfaces are brought into engagement. Such flexing accommodates the desired inward displacement of the rollers into exact centering engagement with the elongated rod. Typically, the rollers comprise inner and outer races with bearing balls therebetween, there being pins extending across the carrier slits and through the inner races of the rollers. Thus, the axially elongated rod is axially supported for endwise movement with minimum resistance to such movement offered by the rollers constructed as described.

These and other objects of the invention, as well as the details of an illustrative embodiment, will be more fully understood from the following detailed description of the drawings, in which:

Fig. 1 is a vertical section through a typical linear bearing of the preferred embodiment of the invention;

Fig. 2 is an end view of the assembly shown in Fig. 1;

Fig. 3 is a section taken on line 3—3 of Fig. 1; and

Fig. 4 is a side view showing in elevation one of the carriers and the rollers supported thereby.

In the drawings, an axially elongated tubular body 10 is shown as having a threaded bore 11 and enlarged recesses 12 sunk inwardly at opposite ends of the body and terminating at interior shoulders 13 extending adjacent the ends of the bore threads. Each of the recesses 12 is formed by an enlarged body counter bore 14 extending inwardly from the end 15 of the body, and by a frusto-conical taper 16 tapering from the counterbore 14 to the shoulder 13, the taper providing a cam surface for the camming operation to be described.

Received into the opposite recessed ends of the body 10 are carriers 17, which include exterior threaded portions 18 screwed into the body bore 11, and acting to hold the cantilevered portions 19 of the carriers in the recesses 12 with the exterior frusto-conical tapered surfaces 20 of the carrier cantilevered portions in camming engagement with the interior frustro-conical surface 16 of the body 10. The cantilevered portions 19 of the carrier are connected to the threaded portions 18 by webs or flexures 21 of reduced radial thickness for flexing as will be described. These webs 21 are shown as being integral with the carrier portions 18 and 19.

Each of the carriers furthermore contains a bore 22 substantially larger than the outer diameter of the elongated shaft or rod 23 shown as received axially endwise through the bores 22 and also through the tubular body or housing 10. The rod 23, carriers 17 and body 10 of course extend coaxially, as illustrated.

As better shown in Figs. 2 and 3 the cantilevered end portions 19 of the carrier 17 contain three slits 24 extending in axial radial planes spaced at 120° intervals about the axis 25, so that the cantilevered end portions 19 are made up of three segments 26 which are equally spaced about the axis 25. These slits extend longitudinally from the radially enlarged cantilevered end portions 19 into the web sections 21 so that each cantilevered segment 26 is supported from the threaded portion 18 of the carrier by its own web section 21, accommodating individual flexing of the cantilevered segment 26 toward and away from the axis 25 independently of similar flexing of the adjacent segments 26. The segments 26 also contain drilled openings 30, the axes of which extend normal to the axial radial planes of the slits 24, the openings themselves extending from the outer walls of the segments 26 to the slits. Furthermore, the openings are arranged symmetrically as shown in Fig. 3 so as to receive carrier pins 31 extending within the openings 30 formed in adjacent segments 26 and across the slits 24.

The pins 31 support roller units 32 in the slits 24 so that they may rotate in the axial radial planes of the slits, each roller unit including an annular inner race 33 receiving the pin, an outer race 34 spaced from the inner race, and a circular arrangement of bearing balls 35 confined between the races 33 and 34 and held properly separated from one another by retainers 134. Thus, each roller unit 32 is of anti-friction design well suited to substantially frictionless endwise reciprocation of the shaft or rod 23 in engagement with the roller units.

Exact centering of the rod 23 for endwise movement is achieved in the following manner. The carriers 17 are adjustably screwed into the tubular body 10 by means of a tool, the prongs of which grip the end openings 36 in the end face 37 of each carrier. Such adjustment screwing causes the cam surfaces 20 of the segments 26 to engage the cam surface 16 of the tubular body, and as a result the segments 26 are forcibly deflected inwardly, as accommodated by forced flexing of the webs 21. Since all of the segments 26 on each carrier are in camming engagement with the tubular body 10, they are deflected inwardly carrying the roller units 32 inwardly simultaneously to take up the clearance between the outer races 34 and the surface or periphery of the shaft 23. Also since the shaft is supported at only two axial locations and at three points at each such axial location, there is exact centering of the shaft. Furthermore, since such adjustment is of a "fine" character, due to the slow displacement of each carrier into the tubular body 10 in response to inward screwing of the carrier, the clearance between the roller units 32 and the shaft periphery is taken up at a controllably slow rate so as to achieve exactly desired pressure centering of the rod by the roller units. As the rod surface wears during its repeated endwise reciprocation, the carrier units may be further adjusted so as to keep the roller units in desired exact centering relation with the rod.

From the foregoing it is seen that the described linear bearing represents a marked advance over the known type of endless ball and track linear bearing discussed in the introduction to the specification, since it is not subject to the relatively high friction, and the inability to be exactly adjusted to a rod, characteristic of the endless loop type linear bearing.

The drawings are to be regarded merely as illustrative of the invention in certain typical embodiments, and it will be understood that various changes and modifications may be made without departure from the invention in its intended spirit and scope.

I claim:

1. An improved linear bearing for supporting an axially elongated member, comprising an assembly including body means having an axis relative to which said member is axially movable, carrier means adjustably shiftable relative to said body means, and a plurality of rollers spaced about said axis and supported by said carrier means for rotation in axial radial planes, said rollers being bodily displaceable in said planes into close engagement with the surface of said member for rotation thereagainst in response to adjustment shifting of the position of said carrier means axially relative to said body means and adjustable means for holding said carrier means in fixed position axially relative to said body means whereby the relative radial locations of said rollers in said planes are determined.

2. An improved linear bearing for supporting an axially elongated member, comprising an assembly including body means having an axis relative to which said member is axially movable, carrier means adjustably shiftable relative to said body means, and a plurality of rollers spaced about said axis and supported by said carrier means for rotation in axial radial planes, said rollers being bodily displaceable in said planes into close engagement with the surface of said member for rotation thereagainst in response to adjustment shifting of the position of said carrier means axially relative to said body means, said body and carrier means having interengaged coaxial threads the relative axial positions of which determine the relative radial locations of said rollers in said planes.

3. An improved linear bearing for supporting a rod member, comprising an assembly including tubular body means having an axis and containing an axial through opening for receiving said rod to move axially endwise relative to said body, carrier means including a pair of axially spaced carriers adjustably shiftable axially relative to said body means, and a plurality of rollers spaced about said axis and supported by said carriers for rotation about roller axes normal to axial radial planes formed by said first axis and radii therefrom, said rollers being bodily displaceable toward said axis into close engagement with the periphery of said rod member for rotation thereagainst in response to adjustment shifting of the position of said carrier means axially relative to said body means, said carrier means having threaded portions screwed coaxially into said body means and said carrier and body means having interengaged cam surfaces axially spaced from said threads and through which force is transmissible acting to retain said carrier means and rollers in desired position relative to said body means said body and carrier means being rigid to hold said rollers against bodily displacement radially outwardly relative to said member.

4. The invention as defined in claim 3 in which said carrier threaded portions are screwed axially oppositely into said tubular body means.

5. The invention as defined in claim 4 in which said rollers are supported by cantilever portions of said carriers, said cantilevered portions being axially spaced from said threaded portions.

6. The invention as defined in claim 5 in which said carriers contain splits extending in said axial radial planes and in which said splits receive said rollers.

7. The invention as defined in claim 5 in which said carriers have webs connecting the carrier cantilever portions with the carrier threaded portions, said webs being adapted to flex in response to screwing of said carriers into said tubular body after said carrier and body cam surfaces are brought into interengagement.

8. The invention as defined in claim 6 in which said rollers comprise inner and outer races and bearing balls therebetween, said carrier means including pins extending across said splits through said inner races and supported by adjacent carrier cantilever portions.

9. In combination, an assembly including an axially elongated member, body means having an axis relative to which said member is axially movable, carrier means adjustably shiftable relative to said body means, and a plurality of rollers spaced about said axis and supported by said carrier means for rotation in axial radial planes, said rollers being bodily displaceable in said planes into selectively close engagement with the surface of said member for rotation thereagainst in response to adjustment shifting of the position of said carrier means axially relative to said body means and adjustable means for holding said carrier means in fixed position axially relative to said body means whereby the relative radial locations of said rollers in said planes are determined.

10. In combination, an assembly including a rod member, tubular body means having an axis and containing an axial through opening receiving said rod for axial endwise movement relative to said body, carrier means including a pair of axially spaced carriers adjustably shiftable axially relative to said body means, and a plurality of rollers spaced about said axis and supported by said carriers for rotation about roller axes normal to axial radial planes formed by said first axis and radii therefrom, said rollers being bodily displaceable toward said axis into selectively close engagement with the periphery of said rod member for rotation thereagainst in response to adjustment shifting of the position of said carrier means axially relative to said body means, said body and carrier means being rigid to hold said rollers against bodily displacement radially outwardly relative to said member, said carrier means having threaded portions screwed coaxially into said tubular body means and said carrier and body means having interengaged cam surfaces axially spaced from said threads and through which force is transmitted acting to retain said carrier means and rollers in desired position relative to said body means.

11. The invention as defined in claim 10 in which said rollers are supported by cantilever portions of said carriers.

References Cited in the file of this patent

UNITED STATES PATENTS

| | | |
|---|---|---|
| 141,986 | Bird | Aug. 19, 1873 |
| 2,618,492 | Singer | Nov. 18, 1952 |
| 2,890,083 | Kampmeier | June 9, 1959 |

FOREIGN PATENTS

| | | |
|---|---|---|
| 577,304 | Great Britain | May 13, 1946 |
| 600,960 | Great Britain | Apr. 23, 1948 |